United States Patent [19]

Southard

[11] Patent Number: 5,781,735

[45] Date of Patent: Jul. 14, 1998

[54] METHOD FOR MONITORING AND MANAGING OPERATIONAL CHARACTERISTICS OF WORKSTATIONS ON A NETWORK WITHOUT USER NETWORK IMPACT

[75] Inventor: Carl D. Southard, Zebulon, N.C.

[73] Assignee: Enterprise Network Services, Inc., Raleigh, N.C.

[21] Appl. No.: 923,311

[22] Filed: Sep. 4, 1997

Related U.S. Application Data

[63] Continuation of Ser. No. 340,224, Nov. 16, 1994, abandoned.

[51] Int. Cl.⁶ .................................................. G06F 13/00
[52] U.S. Cl. .................... 395/200.54; 395/200.55; 395/200.53
[58] Field of Search .................... 395/200.54, 200.55, 395/200.53, 200.59; 707/104

[56] References Cited

U.S. PATENT DOCUMENTS

| | | | |
|---|---|---|---|
| 4,334,270 | 6/1982 | Towers | 364/300 |
| 4,695,946 | 9/1987 | Andreasen et al. | 364/200 |
| 4,713,761 | 12/1987 | Sharpe et al. | 364/406 |
| 4,774,664 | 9/1988 | Campbell et al. | 364/408 |
| 4,799,211 | 1/1989 | Felker et al. | 370/17 |
| 4,817,080 | 3/1989 | Soha | 370/17 |
| 4,823,290 | 4/1989 | Fasack et al. | 364/550 |
| 5,049,873 | 9/1991 | Robins et al. | 340/825.06 |
| 5,067,107 | 11/1991 | Wade | 395/500 |
| 5,101,402 | 3/1992 | Chiu et al. | 370/17 |
| 5,164,983 | 11/1992 | Brown et al. | 379/265 |
| 5,226,120 | 7/1993 | Brown et al. | 395/200 |
| 5,231,593 | 7/1993 | Notess | 364/500 |
| 5,243,543 | 9/1993 | Notess | 364/550 |
| 5,247,517 | 9/1993 | Ross et al. | 370/85.5 |
| 5,251,152 | 10/1993 | Notess | 364/550 |
| 5,261,044 | 11/1993 | Dev et al. | 395/159 |
| 5,274,625 | 12/1993 | Derby et al. | 370/17 |
| 5,295,244 | 3/1994 | Dev et al. | 395/161 |
| 5,315,580 | 5/1994 | Phaal | 370/13 |
| 5,317,564 | 5/1994 | Nugent | 370/17 |
| 5,488,715 | 1/1996 | Wainwright | 395/182.02 |
| 5,519,689 | 5/1996 | Kim | 370/232 |
| 5,551,025 | 8/1996 | O'Reilly et al. | 707/104 |

FOREIGN PATENT DOCUMENTS

| | | |
|---|---|---|
| 0494335 A2 | 7/1992 | European Pat. Off. . |
| 2261801 | 5/1993 | United Kingdom . |
| 2271250 | 4/1994 | United Kingdom . |
| WO 92/21089 | 11/1992 | WIPO . |

*Primary Examiner*—William M. Treat
*Assistant Examiner*—Zarni Maung
*Attorney, Agent, or Firm*—Roberts & Brownell L.L.C.

[57] ABSTRACT

A means for supporting a network manager by collecting data pertaining to the financial and operational characteristics of networks. The network manager collects information concerning the operational and output characteristics of workstation on a network and converts the information to reports that emphasize the network management and financial aspects of a computer network. These reports may be selected, designed and/or formatted by the network executive in a manner that best meets the manager's unique needs. Four distinct activities are performed by the system. These activities provide a network monitor/data collection function, a proprietary network environment to communicate among these activities, an end-user interface system to support network information services, and a resource center activity is a repository of network data collected, information processing, and network coordination and monitor data collection personality. The network transaction data is collected by network monitors and is transmitted in a processed form to a central resource center, which performs a series of data manipulation functions and stores in a database the information necessary to produce both standard and user-defined reports.

16 Claims, 4 Drawing Sheets

METHOD FOR MONITORING AND MANAGING OPERATIONAL CHARACTERISTICS OF WORKSTATIONS ON A NETWORK WITHOUT USER NETWORK IMPACT

"This application is a continuation of Ser. No. 08/340,224, filed Nov. 16, 1994, now abandoned."

FIELD OF THE INVENTION

The present invention relates generally to a network monitoring facility. In particular, the present invention relates to a system for summarizing network usage to give general business decision support. The system of the present invention provides reports of network transactional information from financial and operational viewpoints.

BACKGROUND OF THE INVENTION

The growth of the networking solution to enterprise-wide computer applications has spawned a number of user problems. Many of these problems are based on the operational aspect of the computer hardware and software. The problems that occur have resulted in a number of systems to monitor the network facilities to allow an efficient fault tracking capability. These monitoring systems generally encompass hardware and software that are located at the different client locations and that collect and report on the network operation. The method of user interface and the scope of this support varies by system but the general purpose is consistently the quick detection of network faults or problems and the efficient resolution of these faults or problems or a graphical representation of the network topology. This class of product is designed for use by the system administration professional having numerous years of network expertise.

For example, U.S. Pat. No. 5,315,580 to Phaal for a "Network Monitoring Device and System" discloses a system composed of hardware and software for monitoring and sampling network packets and for delivering this information to a central measurement station. U.S. Pat. No. 5,317,564 to Nugent for a "Merging Network for Collection of Data from Multi-Computers" discloses a system of hardware and software for measuring parameters of operation and transmitting them as packets to a collector node for processing. U.S. Pat. No. 5,295,244 to Dev, et al. for a "Network Management System Using Interconnected Hierarchies to Represent Different Network Dimensions in Multiple Display Views" discloses a network manager which represents the interactions of network entities to a user. It provides a way for the user to access information about the status of the network. U.S. Pats. Nos. 5,226,120 to Brown, et al., 5,101,402 to Chiu, et al., 5,067,107 to Wade, and 4,817,080 to Soha all disclose similar combinations of hardware and software for monitoring the network data by examining packets and presenting a summary of the traffic to support the network administrator.

Early computer networks were simple mainframes communicating to remote job entry (RJE) stations having functions limited to the processing of transactions in support of enterprise applications. These computer networks have evolved into massive complex topologies. The operation of these networks support all phases and operations of the business enterprise. This support includes the former transaction processing applications as well as all phases of the management hierarchy. There are very few business activities that are not supported by these complex computer systems. An implication of this growth in size, complexity, and functionality is that almost all costs of the various business activities are related to the efficient and cost-effective operation of the computer network. The evolution of the purpose and sophistication of the monitor programs has not met this increased level of operational need.

The evolution of computer application has followed a steady path from the old transaction type of processing (payroll, billing, etc.) to almost all levels of the business hierarchy. Many products exist that support the executive in analyzing the information gathered from business applications in order to make well informed specific operational management decisions. The user interfaces of these products have also been enhanced to allow executives the ability to view this information and even to create new ad-hoc views to support their particular business activities. These products allow the summarizing of transactional data and the creating of simple but effective representations that will allow the decision maker to make an informed decision as well as to create presentations that will persuade other interested management personnel to accept these decisions. This use of the lower level transactional data to create these up to the minute operational views has not yet been translated into network monitoring activities.

The monitoring programs that are currently available can be compared to the early programs that allowed some creation of transactional summary information from the early computer applications. The present day monitors require a computer professional to understand the implications of the network transactions and the results are given purely in terms of finding and the detecting any faults and operational difficulties of the network. Other products only focus on giving a graphical representation of the network. There is a strong and present need to upgrade the level of these programs to facilitate the same sort of decision support mechanisms that are available to the business management executives.

The monitor programs currently available allow the user to pick a transaction type and to pull network statistics from simple databases that keep a record of all packets (lowest level of network transaction). These statistics can be formed into reports that are understood by an experienced network professional in order to facilitate the detection of the location and type of network fault conditions. Other types of systems could be used to collect and present, in a meaningful and useful way, the kind of information required by business management executives.

For example, there has long been a need to be able to control the network operation from an executive management perspective. The information that is being gathered could be combined with business information relating to costs of operation. The user interface should be able to be used by a non-computer professional and the information that is presented would pertain to the business objectives and control of the computer network as a critical business function. The ability to create timely ad-hoc reports of the information cross referenced by location, time of day, and type of equipment and/or other factors of interest to the user would play an important role in helping management determine the most efficient usage of the most costly network components. These reports should also identify what usage requirements are needed in each location including the elusive random burst usage information. A system is necessary to make this evolutionary leap to control these increasingly complex network topologies with a simple easy to understand implementation and user interface in order to provide meaningful information and useful network activity measurement capabilities.

SUMMARY OF THE INVENTION

It is therefore an object of the present invention to provide a computer hardware and software system to facilitate the user's financial and organizational control of the network topology.

It is an additional objective of the present invention to provide an overview of the entire network with a minimum of delay.

It is a further objective of the present invention to provide data pertaining to network cost factors, for example, network maintenance performance such as hardware mean-time to failure and mean-time to repair.

It is also an objective of the present invention to provide comparisons of network operations in different time zones by client/server, or by user defined transaction activity and/or essentially any factor that can be user defined.

It is a further objective of the present invention to provide dedicated virtual network equipment and network facility reports.

It is an additional objective of the present invention to provide users the ability to easily update network information such as client/server additions and deletions before the effective date of the change.

It is another objective of the present invention to provide information on the condition of the network, LAN, or client/server availability.

It is also an objective of the present-invention to provide information on network operations and statistics on network activity, site location, equipment type, and communication link type.

It is yet a further objective of the present invention to provide a comparison of vendor performance such as the impact of time of day, holidays, major disasters, etc., on vendor performance.

These and other objects and advantages of the present invention will be apparent to those of ordinary skill in the art upon inspection of the detailed description, drawings, and appended claims.

The system of the present invention is a means for supporting a network manager by collecting data pertaining to the financial and operational characteristics of networks. The network manager collects information and converts the information to reports that emphasize the network management and financial aspects of a computer network. These reports may be selected, designed and/or formatted by the network executive in a manner that best meets the manager's unique needs.

The present invention accomplishes this function through the use of four distinct activities performed by the system. These activities provide a network monitor/data collection function, a proprietary network environment to communicate among these activities, an end-user interface system to support network information services, and a resource center activity is a repository of network data collected, information processing, and network coordination and monitor data collection personality.

The network transaction data is collected from each configured LAN by the attached network monitors. This data is transmitted in a processed form to a central resource center. The central resource center performs a series of data manipulation functions and stores in a database the information necessary to produce both standard and user-defined reports. The end-user is allowed-to directly input data that gives vendor specific information, and also to input a description of the network hardware, software, and interfaces. The end-user can also define sub-activities (virtual networks) to facilitate the tracking of information in relation to a specific business unit. The enduser may specify a number of conditions (alarms) that will produce specific management attention if met. These include critical and sensitive situations as well as specific location outages.

BRIEF DESCRIPTION OF THE PRESENT INVENTION

DETAILED DESCRIPTION OF THE PRESENT INVENTION

Definitions

Network Management Resource Services or ("NMSR") is a product family that allows enterprise network users to manage, monitor, measure, and improve the cost/performance of a business activity.

A Transaction is one or more functions, which, when executed, accomplish a specific enterprise purpose (business or network).

NMRS Data is data generated from the NMRS Monitor "which is a personal computer such and an IBM compatible PC or Macintosh PC having the ability to execute programs and store data. The Monitor further has the capability to receive and transmit information of a LAN. The NMRS Monitor resides on each segment of a customer's network and examines a customer's data for activity of interest." for database use.

NMRS Monitor is the source of NMRS data. This is normally a device that is connected to each LAN in a network.

User Console is an input/output device that permits the user to communicate with the NMRS User Service Management Resource Desk.

NMRS User Resource Desk is an interface that responds to a user request and accepts user-provided instructions and data from the user console.

Sub-Activity (Business) is a network activity that is an integral subset of a Business Activity. For example, inventory "look up" might be a sub-activity of a Sales Activity.
Disclosure The present invention, known as Network Management Resource Services (NMRS), collects and monitors is able to collect and monitor network traffic information and high level financial and operational management information. This information is used to supports strategic network management decisions in such areas as asset management and control, vendor hardware repair/maintenance cost comparisons, and other user configurable reporting areas. The different system functions are integrated to allow an enterprise-wide collection of network data and to transform this data into information that is available to a management professional.

Figure 1:
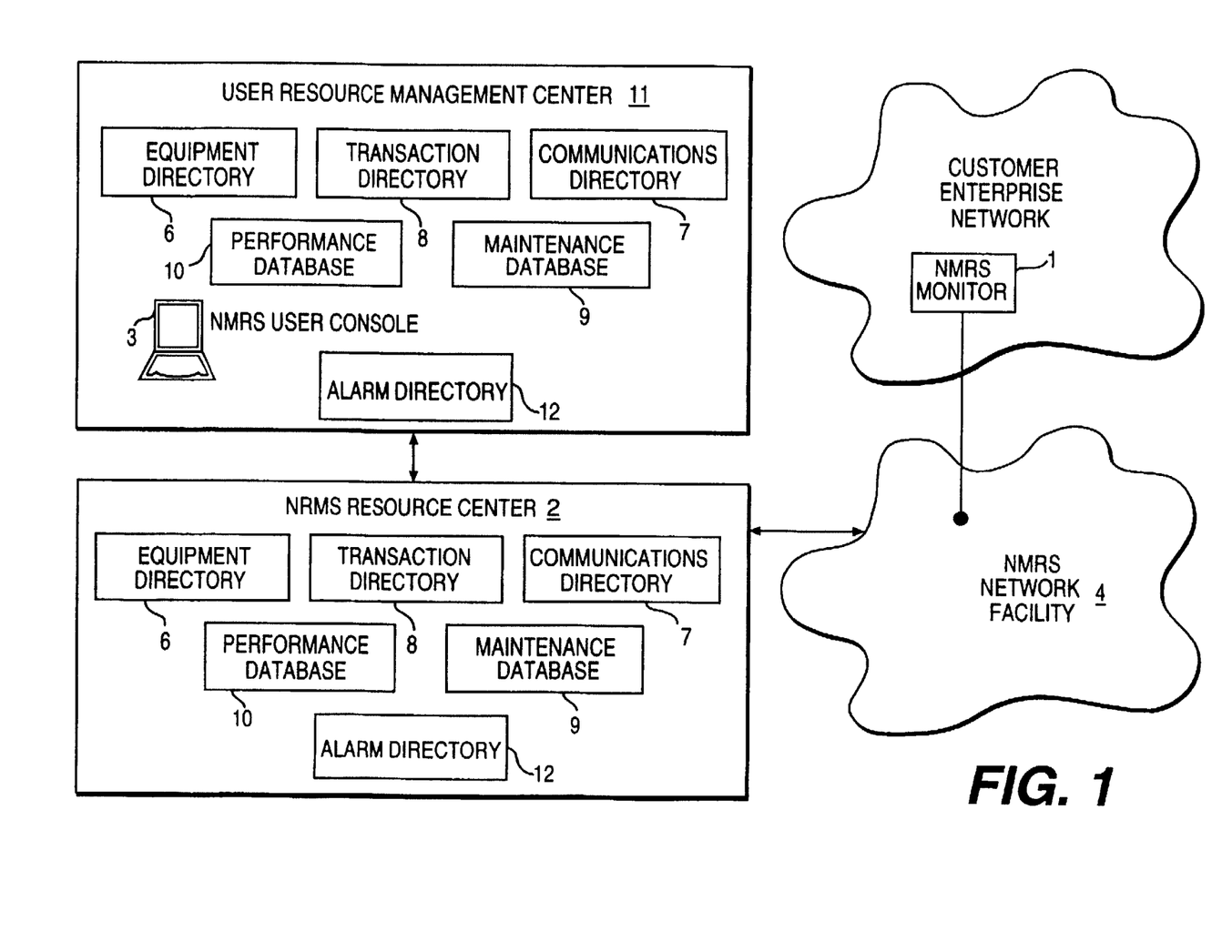
FIG. 1 shows a block diagram of the system of the present invention.

The user (typically a network executive or staff) retrieves figures on the MTBF for vendor specific, site specific, usage rate, activity type, etc. The system focus is on the reporting of network performance and availability, and on numerous cost factors as opposed to fault diagnosis. Referring to FIG. 1, the NMRS system is described. The NMRS system includes four major functional modules. These are the NMRS Resource Center 2, the User Resource Management Center 11, the NMRS Network Facility 4, and the NMRS Monitor 1.

The NMRS Resource Center 2 serves as a database depository to support user network data collection and user report generation. This service is supported by and is physically located on a supplier's premises. The system is supported by the use of a database manager, the NMRS Network Facility 4, computer system hardware base, NMRS application programs, and the transmitted data summaries collected by the NMRS Monitor 1.

The User Resource Management Center 11 has a functional capability similar to that of the NMRS Resource Center 2. The User Resource Management Center 11 is physically located on the user's premises whereas the NMRS Resource Center 2 is located on the suppliers premises. The system is set up and supported by components similar to those of the NMRS Resource Center 2. One exception is that the data collection function is only performed by the NMRS Resource Center 2. An NMRS User Console 3 is attached to this system in order to provide the user with an application interface to the created information. This information is downloaded from the NMRS Resource Center 2 via the NMRS Network Facility 4.

The NMRS Network Facility 4 transports data collected from the user network by the NMRS Monitor I to the NMRS Resource Center 2. This data summarized by the NMRS Monitor 1 to limit the amount of data that is sent. The NMRS Network Facility 4 is also used to transport the data required to provide NMRS services to its users.

The NMRS Monitor 1 is connected to each LAN in the user's network. The NMRS Monitor 1 collects data for each user-defined transaction. The summarized results are passed to the NMRS Resource Center 2 via the provided NMRS Network Facility 4.

The NMRS Resource Center 2 defines the logical user network by the use of three directories. These directories support the storage and retrieval of user information to identify the hardware, links, and customer-specific information that details the type of transactions to be managed as well as data on vendors and business activities. These directories are called the Equipment Directory 6, the Communications Directory 7, and the Transaction (sub-activity) Directory 8.

The Equipment Directory 6 is a group of tables that define the network and record data for use in customer reports. The following is an outline of some key items that are included in the equipment directory:

LAN table—a record for each user LAN;

LAN type table—a record for each type of user LAN;.

Site table—a record for each user site where one or more LAN's are located;.

Status table—a record for each customer-assigned state condition;.

Device table—a record for each device (or node) on any LAN;

Kind table—a record for each kind (file server, etc.) of device on any LAN;

Device type table—a record for each type of device (or node) on any LAN (example: Compaq 486–16, 16M, 500MB);

OS table–a record for each type of operating system used in a device on any LAN (example: DOS 6.2).

The Communication Directory 7 defines which interconnect network LANs. There may be as few as one communications link in this directory.

Vendor table—a record for each vendor(or supplier) of communications channels connected to devices on any LAN. Typically the communication channel is connect to a LAN by a router device.

The Transaction Directory 8 contains a group of tables that define the virtual networks constituting the total enterprise network. This organization will always contain at least the following two tables:

Sub-activity table—a record for each customer-defined sub-activity defined for any business activity; and Business activity table—a record for each customer-defined business activity.

The NMRS Resource Center 2 supports two other basic functions. These are a Performance Database 10 and an Alarm Directory 12. The Performance Database 10 contains a record for each combination of origination unit, termination unit, and business activity which provides the number of frames and average sizes of frames for each period of time (nominally six minutes). The Alarm Directory 12 is a group of tables that specify customer-assigned names for alarm conditions, customer selections for conditions to be alarmed and customer selection of alarm display and alerting treatment.

The User Resource Management Center 11 contains a similar technical organization. The information is received from the NMRS Resource Center 2 based on a user request that is entered via the User Console 3 and downloaded by the NMRS Network Facility 4. There is no network monitor data collection function within this system. This keeps the process of collecting and packaging of network transactions from affecting other non-NMRS applications.

The NMRS Network Facility 4 provides the coordination between the various NMRS activities. This mechanism provides the means by which the collected data from the NMRS Monitor 1 is transported to the NMRS Resource Center 2. The NMRS Network Facility 4 also delivers the information to the User Resource Management Center 11 that is necessary to support the various end-user information analysis and maintenance applications.

The NMRS Monitor 1 is connected to each LAN in the user's network. The NMRS Monitor application collects data for each user transaction. Each data record has at least five pieces of information. These are the origination unit, the destination unit, the transaction type, the frame count, and the frame size. At a programmable interval, the user activity records are bundled by the monitor together with a header including the monitor number, the time interval, and the record count. The processed activity records with a header record are transmitted to the NMRS Resource Center 2 via the NMRS Network Facility 4.

Once the NMRS is installed, the user-specific data about the configuration of the network is entered. This includes all of the information used to support the end-user applications as well as customer selected information to support specific personalized application interfaces. This information includes data about the type of hardware, the location of hardware, LANs, virtual (logical) networks, operating systems, vendors, and definitions for business activities and sub-activities. Also, the user describes the names and conditions and user-interface options of the alarms (management alert) database.

Once the NMRS is operational the NMRS Monitor 1 begins to transmit transaction data to the NMRS Resource Center 2. First, the information is grouped and packaged with information identifying the particular monitor. The information is sent to the NMRS Resource Center 2 via the NMRS Network Facility 4. The information is then analyzed and records are created that store transaction averages by activity and sub-activity.

The User Resource Management System 11 is now able to provide management information to the end-user via the NMRS User Console 3. The user selects to begin. The NMRS Resource Center 2 receives the request via the NMRS Network Facility 4. The NMRS application programs then begin to format the information that support the end-user interface as well as collect the most up to date information. After a period of less than 10 minutes, the end-user session is ready to begin.

The end-user can select from a wide variety of reports that use the existing database. A partial list includes:

hardware repair /maintenance by vendor report;
MTBF rates by vendor;
MTBF rates by site location;
MTBF by usage rate;
MTBF by activity or sub-activity type;
vendor response time by location;
vendor response time by time of day;
vendor mean time to repair;
asset control and location reports;
comparisons for the same operational hour by hardware type;
comparisons for the same operational hour by transaction type;
equipment reports.

These reports show the orientation of the information with respect to network availability, relative cost factors, and network performance versus fault diagnosis. Many other types of reporting can be selected by using the data that has been collected in creative user selectable ways.

Figure 2:
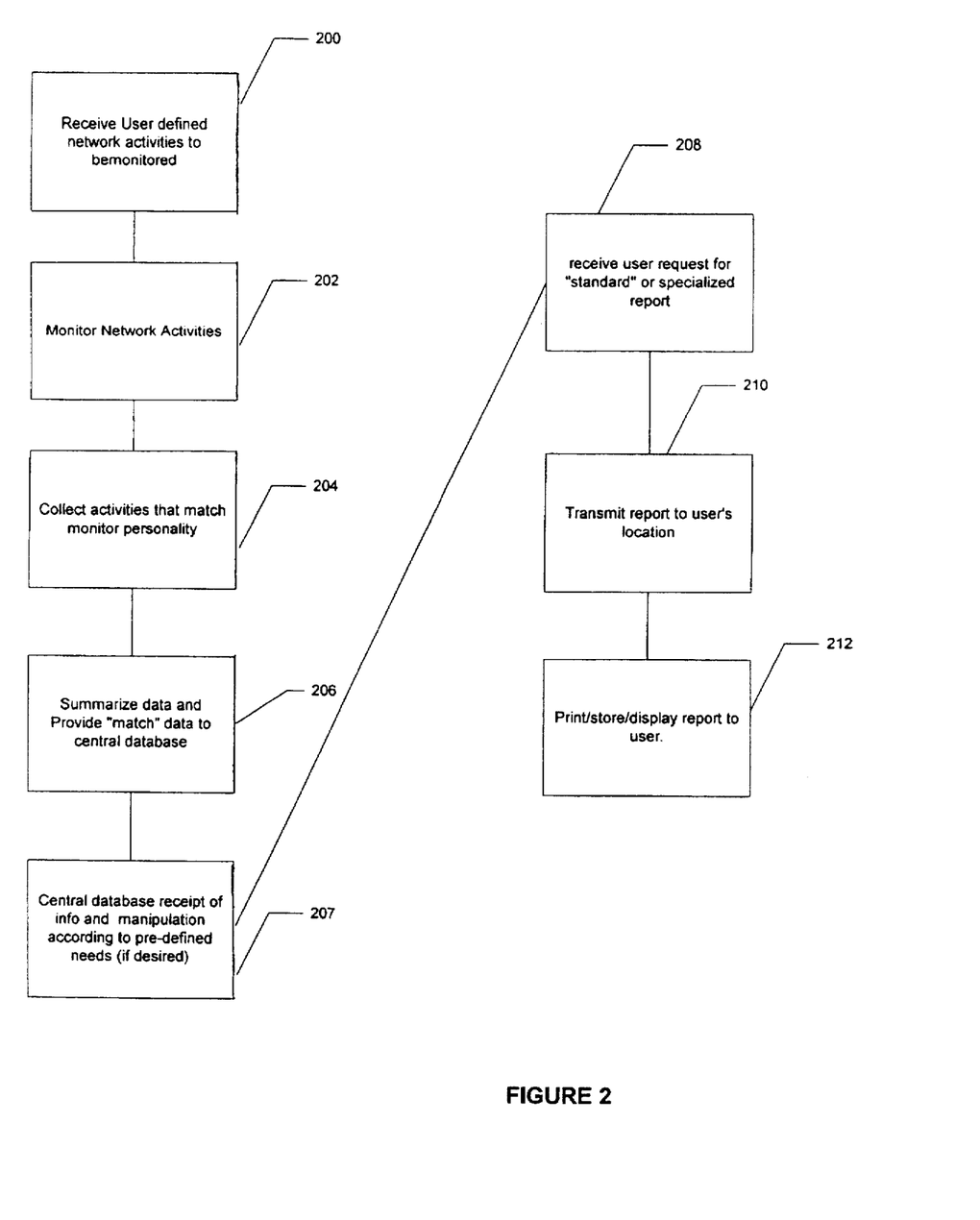
FIG. 2 shows the NMRS process flow.

Referring to FIG. 2 the flow of NMRS processing is described. A user first defines the network and the network activities that are to be monitored 200. These activities or any activities that a user desires to categorize and quantify in a particular fashion. This information is stored on the NMRS monitor.

Thereafter the NMRS monitor monitors the activities over the network according to the predefined user categories.

When "matches" are found to the activities desired to be monitored the matches are collected 204 according to the monitor personality.

Since matches may occur at any given time, the information on matches is aggregated and summarized 206 and provided to a central data base.

The central data base receives the summarized match information and either manipulates that information according to predefined user or port needs 207 or simply aggregates the information and request information from the data base 208 as either standard report or a customized report. Information is then transmitted to the user's location 210 and subsequently printed or stored or displayed according to user needs 212.

It should be noted that the user has complete flexibility to define any particular network transaction of interest as well as to designate report format parameters that would be most useful to the user. The NMRS monitor has the capability of receiving not only the network transaction information of interest to the user but also can store the network topology that is of the interest to the user.

The NMRS data base has the capability of manipulating the data obtained by the NMRS monitors according to predefined needs or upon a request by the user for a customized reports generate reports via its data base storage and retrieval software according to the specific needs of the user.

In establishing and NMRS communications capability that does not impact the user's local area network, the NMRS monitors can utilize a "virtual" network such as the Internet thereby creating a network that is specific to sending an NMRS particular data to the central data base. Additionally, a dedicated communications capability is contemplating whereby specific lines dedicated to the NMRS collection effort are utilized.

In monitoring network activities the NMRS monitors can draw from equipment directories comprised of the types of equipment on the network that is to be monitored, transaction directories, that is the types of transactions which are to be monitored on a user's network and communications directories which involve monitoring the various communications paths that a user might have an interest in categorizing and evaluating.

Figure 3:
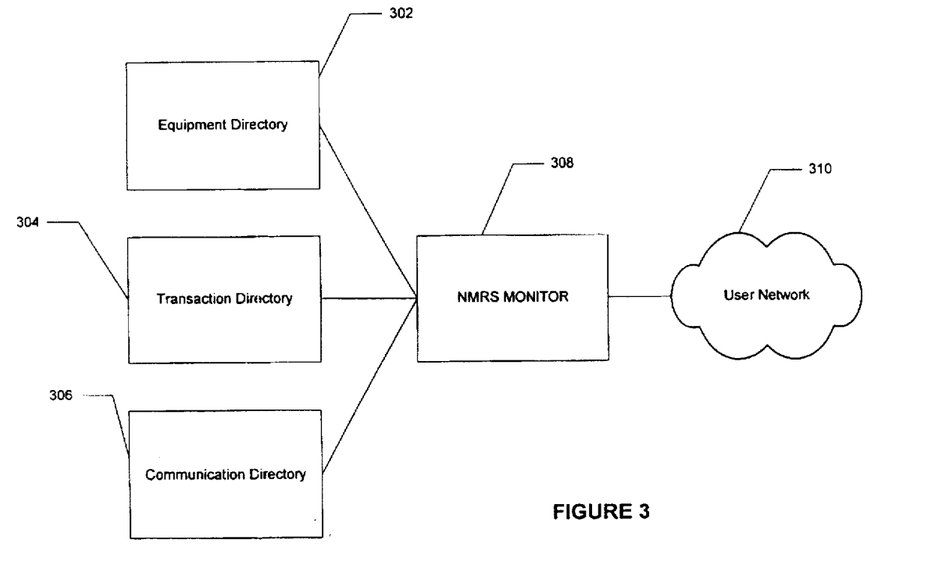
FIG. 3 shows the NMRS Monitor Directory information sources.

Referring to FIG. 3 the NMRS monitor is further described. The NMRS monitor can collect data from a user's network 310 according to user defined information. Such information can be the equipment directory 302 which comprises a directory of all of the various types of equipment on a user's network, a transaction directory 304 which describes all of the transactions on the various equipment that the user wishes to monitor and a communications directory 306 which comprises the various communications paths and utilization of networks and links that a user wishes to have monitored.

Figure 4:
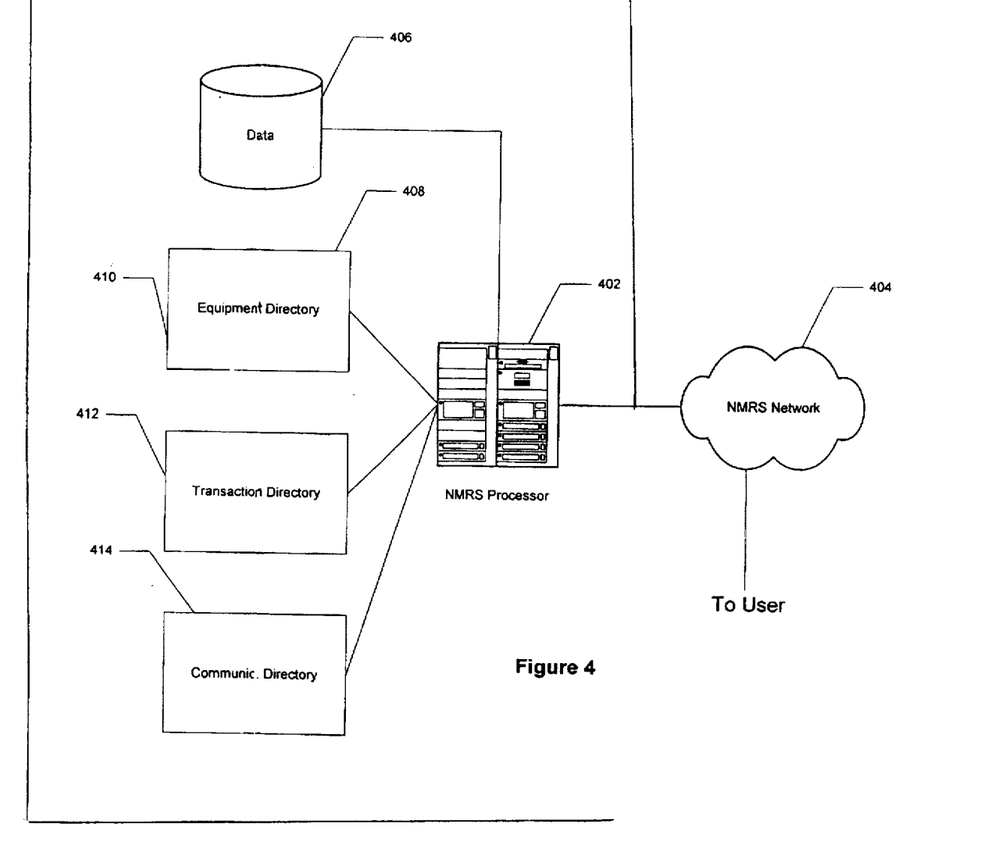
FIG. 4 shows the NMRS resource facility and processor.

Referring to FIG. 4 the NMRS resource center is shown. NMRS processor 402 receives information from a user over the NMRS network 404. The NMRS processor 402 creates both standard and customized reports based on directories associated with a user's network. For example equipment directory 408 has information concerning the equipment on a user's lan. Transaction directory 412 comprises information concerning transactions that a user desires to monitor. Communication directory 414 comprises information on the various links in a given user's lan. Information that is gathered from a user's lan is then stored in data base 406 awaiting requests for standard and customized reports from a user. These reports are the provided to the user over the NMRS network 404.

Preferred and alternate embodiments of the present invention have now been described in detail. It is to be noted, however, that this description of these specific embodiments is merely illustrative of the principles underlying the inventive concept. It is therefore contemplated that various modifications of the disclosed embodiments will, without departing from the spirit and scope of the invention, be apparent to persons of ordinary skill in the art.

What is claimed is:

1. A method for providing reports on characteristics of traffic on a computer network without polling network resources, comprising:

(a) defining network transactions to be monitored (b) monitoring all network transactions on a first network;

(c) collecting data for the first network transactions, wherein the data collection is based on the LAS defined network transactions and on information in directories and is performed by a network monitor;

(d) providing the data to a database depository, wherein the data is transported to the database depository by a network facility;

(e) manipulating the data to produce a report describing management and financial characteristics of the network based on user defined report characteristics;

(f) receiving a user request for the report;

(g) transmitting the report to an end-user location over a second network; and (h) presenting the report to the user.

2. The method of claim 1, further comprising:

(a) receiving user inputs defining particular network transaction data of interest;

(b) receiving user data defining particular report format parameters;

(c) receiving user data defining a network topology of interest;

(d) manipulating the data defining particular report format data, the data defining particular report format parameters, and the data defining a network topology of interest to produce a custom report describing the network management and financial characteristics of the network of interest to the user;

(e) receiving a user request for a custom report;

(f) transmitting the custom report to an end-user location; and (g) presenting the custom report to the user.

3. The method of claim 2, further comprising:

(a) storing the user inputs defining particular network transaction data of interest of a first user, the user data defining particular report format parameters of the first user, and the user data defining a network topology of interest of the first user; and (b) automatically applying the user inputs defining particular network transaction data of interest of the first user, the user data defining particular report format parameters of the first user, and the user data defining a network topology of interest of the first user to the network data in response to a request for a network report by the first user.

4. The method of claim 1, further comprising summarizing the data for the network transactions prior to transmitting the data to the centralized database.

5. The method of claim 1, wherein the standard report further describes operational characteristics of the network.

6. The method of claim 1, wherein providing the data to a centralized database includes sending the data via a dedicated communications facility to the centralized database.

7. The method of claim 6, wherein the dedicated communications facility is a virtual network.

8. The method of claim 6, wherein the dedicated communications facility is a physical communications network.

9. The method of claim 1, wherein the monitoring of network transactions and the collection of data takes place continuously.

10. The method of claim 1 wherein monitoring all network transactions comprises capturing and measuring user local area network activity, and wherein collecting data for the network transactions comprises classifying the local area network activity according to defined categories.

11. The method of claim 6, wherein monitoring all network transactions comprises capturing and measuring user local area network activity, and wherein collecting data for the network transactions comprises classifying the local area network activity according to defined catgories.

12. The method of claim 10, wherein the defined catgories are user-defined.

13. The method of claim 10, wherein the defined catgories are defined by at least one directory, said at least one directory being selected from the group of directories consisting of equipment directories, transaction directories, and communications directories.

14. The method of claim 1, further comprising manipulating the data to produce a custom report describing management and financial characteristics of the network according to any format defined by a user.

15. The method of claim 1, further comprising storing the report for future presentation to a user.

16. The method of claim 15, further comprising presenting a plurality of stored reports to the user in a comparison format.

* * * * *

UNITED STATES PATENT AND TRADEMARK OFFICE
CERTIFICATE OF CORRECTION

PATENT NO.       : 5,781,735                                              Page 1 of 1
APPLICATION NO.  : 08/923311
DATED            : July 14, 1998
INVENTOR(S)      : Carl D. Southard It is certified that error appears in the above-identified patent and that said Letters Patent is hereby corrected as shown below:

In the Claims, at column 8, line 57, the text "LAS" should be deleted.

Signed and Sealed this

First Day of May, 2007

JON W. DUDAS
*Director of the United States Patent and Trademark Office*